Figure 1:
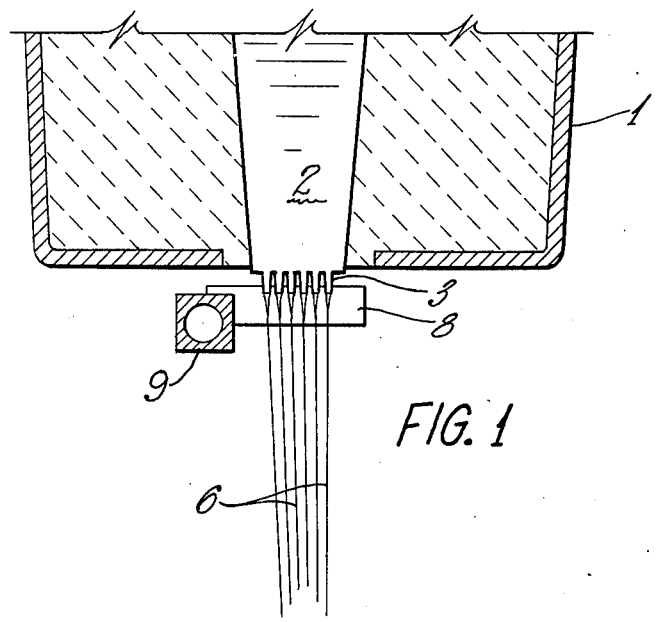

United States Patent [19]

Costin

[11] 4,123,263

[45] * Oct. 31, 1978

[54] PLATINUM-RHODIUM ALLOYS

[75] Inventor: Darryl J. Costin, Columbus, Ohio

[73] Assignee: Owens-Corning Fiberglas Corporation, Toledo, Ohio

[*] Notice: The portion of the term of this patent subsequent to Mar. 29, 1994, has been disclaimed.

[21] Appl. No.: 847,887

[22] Filed: Nov. 2, 1977

[51] Int. Cl.² ............................................. C22C 5/04
[52] U.S. Cl. ...................................... 75/172 R; 65/12
[58] Field of Search ................. 75/172 E, 172 R, 177; 65/12

[56] References Cited

U.S. PATENT DOCUMENTS

| | | | |
|---|---|---|---|
| 2,135,611 | 11/1938 | Williams et al. | 18/1 |
| 2,515,738 | 7/1950 | Slayter et al. | 49/17 |
| 2,908,036 | 10/1959 | Russell | 18/8 |
| 3,622,289 | 11/1971 | Hansen et al. | 65/1 |
| 3,622,310 | 11/1971 | Reinacher | 75/165 |
| 3,676,114 | 7/1972 | Selman | 75/172 |
| 3,737,309 | 6/1973 | Chain et al. | 75/172 R |
| 3,779,728 | 12/1973 | Hansen et al. | 65/1 |
| 4,014,692 | 3/1977 | Costin | 75/172 |
| 4,018,586 | 4/1977 | Cates, Jr. et al. | 65/2 |
| 4,043,778 | 8/1977 | Harris | 65/1 |

FOREIGN PATENT DOCUMENTS 1,238,013 7/1971 United Kingdom ................. 75/172 R

OTHER PUBLICATIONS

Loewenstein, K. L., "The Manufacture . . . Glass Fibers", Platinum Metals Rev., 19, (1975), 82.
Novikov et al., "Creep . . . Pt with Rh at . . . 1350°–1500° C", Platinum Metals Rev., 12, (1968) 75.

Primary Examiner—L. Dewayne Rutledge
Assistant Examiner—Upendra Roy
Attorney, Agent, or Firm—Ronald C. Hudgens; Charles F. Schroeder; Robert F. Rywalski

[57] ABSTRACT

Platinum-rhodium alloys containing small amounts of boron and zirconium have low creep rates and high resistance to glass corrosion making the alloys particularly suitable for glass-fiberizing bushings.

20 Claims, 2 Drawing Figures

PLATINUM-RHODIUM ALLOYS

CROSS REFERENCE

This application is related to my U.S. Pat. No. 4,014,692, issued Mar. 29, 1977, which is hereby incorporated by reference, on application Ser. No. 647,690 filed on Jan. 9, 1976. Ser. No. 647,690 was foreign filed and the earliest foreign filing was in Mexico on Nov. 30, 1976 as Ser. No. 167,221. The first foreign filed application to issue was Belgium filed on Dec. 31, 1976.

This invention relates to platinum-rhodium alloys having low creep rates.

In one of its more specific aspects, this invention relates to alloys particularly suitable for the production of bushings employed for the production of glass fibers.

In a present method of producing glass fibers, molten glass is drawn through one or more orifices positioned in one wall of a chamber called a bushing. The bushing must be chemically resistant to the molten glass and must be dimensionally stable at operating temperatures in the range of from about 1800° F. to about 2500° F.

Dimensional stability, particularly in respect to creep rate, is of particular significance inasmuch as deformation of the bushing results in improper heat distribution across the orifice-containing wall of the tip section of the bushing, misalignment of the orifices and enlargement of the orifices through which the molten glass is withdrawn.

There is a wide variety of bushings known in the art, for example, two such assemblies are shown in U.S. Pat. Nos. 2,515,738 and 2,908,036.

U.S. Pat. No. 3,622,310 and British specification No. 1,238,013 respectively disclose dispersion hardened and dispersion strengthened platinum-rhodium alloys by use, for example, of zirconium. They fail however to suggest or describe the present invention.

Binary platinum-rhodium alloys have been most successfully used in continuous glass-fiberizing bushings because of the unique chemical inertness of such alloys to molten glass environments at elevated temperatures. However, recent developments in the technology of glass fiberizing are approaching the limits of strength that can be achieved in the platinum group metals by conventional solid solution strengthening. The intrinsic lack of elevated temperature creep and stress-rupture strength of the prior art platinum-rhodium alloys have imposed severe limitations on both the design of fiberizing bushings and the temperature of the fiberizing operations. In general, it has been found that ternary non-precious metal elemental additions to prior art alloys provide only marginal increases in mechanical properties and then only at the expense of a significant reduction in glass corrosion and oxidation-resistant properties.

There has now been developed an alloy which is produced by conventional alloying techniques and which has superior high temperature stress-rupture and creep properties while being equivalent to the best prior art alloy in respect to resistance to glass corrosion and oxidation. This alloy is particularly suitable for employment as fiberizing hardware, such as bushings, the service life of which is limited by tip section sag or creep at elevated temperatures. Additionally these alloys may be employed as furnace linings, such as, for example, a glass contacting liner or a skimmer block.

An object of this invention is to provide for a novel platinum alloy which may be used in glass manufacturing as a liner or bushing.

Another object is to provide a platinum alloy having superior creep resistant properties.

Thus in accordance with this invention there is provided an alloy consisting essentially of the following in weight percent:

B. — 0.001 to about 0.5
Zr — about 0.015 to about 1.25
Rh — about 10 to about 40
Pt — balance Fine results are obtained with that alloy when, for example, B is less than 0.01%, or when Zr is in excess of 0.055%, or when Zr is less than 0.3%, or when B is less than about 0.09%. For example an outstanding bushing alloy results when B is 0.001 to less than about 0.09% and Zr is less than about 0.3%, especially when the latter is in excess of 0.055%. Desirably, rhodium will be present between about 22% to about 26% by weight.

Further in accordance with this invention there is provided as a composition of matter a creep resistant alloy consisting essentially of rhodium in an amount of from about 10 to about 40 weight percent, boron in an amount of about 0.002 to about 0.05 weight percent, zirconium is an amount of about 0.064 to about 0.27 weight percent and the balance of said composition being platinum.

The alloy of this invention consists in its most preferred embodiments, of a platinum-rhodium solid solution matrix in which small quantities of boron and zirconium, preferably, are dispersed therein.

In a less preferred embodiment of this invention, at least one element slected from the group consisting of hafnium and magnesium can be substituted for all or part of the zirconium. It is to be understood that an alloy employing hafnium and/or magnesium is not the equivalent of one employing solely zirconium.

In a less preferred embodiment of this invention, at least one element selected from the group consisting of yttrium, lanthanum, titanium, niobium, and tantalum can be substituted for all or part of the zirconium. It is to be understood that an alloy produced by such a substitution is not the equivalent to one employing solely zirconium.

When so substituted the substituted element or elements, are included in a total amount equal to that amount in which the zirconium would be included.

Also, according to this invention, there is provided a bushing comprising the aforementioned alloys.

Figure 2:
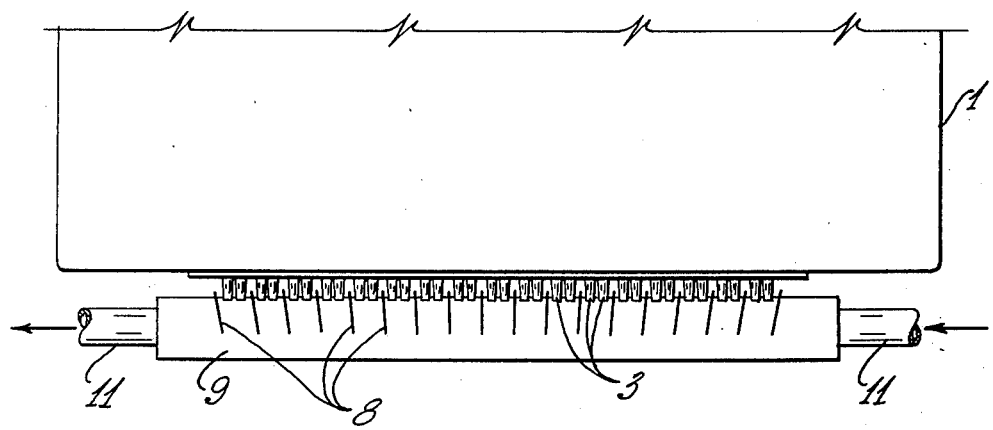

The alloys of this invention are particularly suitable for the production of bushings, a typical bushing being illustrated in attached FIGS. 1 and 2. FIG. 1 is side-elevational view of a fiber-forming bushing and FIG. 2 is a partial front-elevation view of the apparatus of FIG. 1.

Referring now to these figures, there is shown bushing 1 comprising a chamber for holding glass mass 2. The chamber is adapted with feeder tips 3 through which glass is emitted and attenuated into fibers 6. Positioned between feeder tips 3 can be fins, or finshield, 8 extending from a cooled manifold 9, a coolant being supplied through conduit 11. Any, or all, portions of such a bushing can be produced of the alloy described herein. Preferably, the chamber and feeder tips will be fabricated of the alloy of this invention.

Alloys of this invention were manufactured by vacuum induction melting platinum and rhodium together, with boron and zirconium being introduced shortly before pouring. Sheet stock was manufactured by cold rolling with intermediate anneals for 30 minutes at 2100° F., and a final recrystallization heat treatment for 30 minutes at 2100° F. The sample sheet stock contained about 24 weight percent rhodium, boron and zirconium in the analyzed amount as indicated in Table 1, with the balance being platinum. Sample I is a conventional 76-24 Pt/Rh bushing alloy. Testing of machined samples, under various stress and temperature conditions, for creep produced the results tabulated in Table I.

TABLE I

| Sample | % B | % Zr | Stress (p.s.i.) | Creep Rate (as in./in./hr. $\times 10^{-4}$) | | |
|---|---|---|---|---|---|---|
| | | | | 2400° F | 2450° F | 2500° F |
| I. a. | — | — | 600 | 0.89 | 1.29 | 1.90 |
| b. | — | — | 800 | 1.75 | 2.82 | 4.54 |
| c. | — | — | 1000 | 3.91 | 6.40 | — |
| II. a. | 0.007 | 0.064 | 600 | 0.65 | 0.97 | 1.44 |
| b. | " | " | 800 | 1.34 | 1.92 | 2.79 |
| c. | " | " | 1000 | 3.26 | 5.04 | — |
| III. a. | 0.007 | 0.27 | 600 | 0.64 | 0.75 | 0.91 |
| b. | " | " | 800 | 1.50 | 2.13 | 3.10 |
| c. | " | " | 1000 | 2.81 | 4.55 | 7.41 |
| IV. a[1] | 0.037 | 0.055 | 800 | 3.64 | — | — |
| b[2] | " | " | 800 | 3.85 | — | — |
| c[3] | " | " | 800 | 3.44 | — | — |
| V. | 0.004 | 0.11 | 800 | 1.22 | 1.89 | — |
| VI. | <0.001 | 0.008 | 800 | 2.01 | — | — |
| VII. | <0.001 | 0.25 | 800 | 3.36 | — | — |
| VIII. | 0.002 | 0.067 | 800 | 1.32 | — | — |

[1] fractured after 29.5 hours at 2400° F
[2] fractured after 98.8 hours at 2400° F
[3] fractured after 24.2 hours at 2400° F Sample V was a sheet with a thickness of 0.020 inches with all others being 0.040. Additionally an alloy of composition IV was manufactured on a different occasion but because of a faulty temperature controller it was not made under the temperature condition indicated above; under a stress of 800 p.s.i. that alloy showed a creep rate of $0.46 \times 10^{-4}$ and $0.66 \times 10^{-4}$ at 2400° F and 2450° F respectively.

It will be evident that various modifications can be made to this invention. Such, however, are considered as being within the scope of the invention.

I claim:

1. As a composition of matter a creep resistant alloy consisting essentially of rhodium in an amount of from about 10 to about 40 weight percent, boron in an amount of about 0.002 to about 0.05 weight percent, zirconium is an amount of about 0.064 to about 0.27 weight percent and the balance of said composition being platinum.

2. The composition of claim 1 wherein rhodium is present in an amount of about 22 to about 26%.

3. As a composition of matter, an alloy consisting essentially of the following in weight percent B — 0.001 to about 0.5
Zr — about 0.015 to about 1.25
Rh — about 10 to about 40
Pt — balance.

4. The composition of claim 3 wherein B is less than about 0.01%.

5. The composition of claim 3 wherein Zr is in excess of 0.055%.

6. the composition of claim 3 wherein Zr is present in an amount less than about 0.3%.

7. The composition of claim 3 wherein B is present in an amount less than about 0.09%.

8. The composition of claim 3 wherein B is less than about 0.09% and Zr is less than about 0.3%.

9. The composition of claim 3 wherein Rh is about 22% to about 26%, Zr is about 0.055% and B is about 0.037%.

10. A bushing comprising the composition of claim 3.

11. The composition of claim 8 wherein Zr is in excess of 0.055% and Rh is between about 22 to about 26%.

12. The composition of claim 11 wherein B is about 0.007% and Zr is about 0.064%.

13. The composition of claim 11 wherein B is about 0.007% Zr is about 0.27%.

14. The composition of claim 11 wherein B is about 0.002% and Zr is about 0.067%.

15. A bushing comprises the composition of claim 9.

16. A composition consisting essentially of rhodium in an amount within the range of from about 10 to abuot 40 weight percent, boron in an amount within the range of from 0.001 to about 0.5 weight percent and zirconium, hafnium and magnesium in a total amount within the range of from about 0.015 to about 1.25 weight percent, the balance of said composition being platinum.

17. A composition consisting essentially of rhodium in an amount within the range of from about 10 to about 40 weight percent, boron in an amount within the range of from 0.001 to about 0.5 weight percent and zirconium and hafnium in a total amount within the range of from about 0.015 to about 1.25 weight percent, the balance of said composition being platinum.

18. A composition consisting essentially of rhodium in an amount within the range of from about 10 to about 40 weight percent, boron in an amount within the range of from 0.001 to about 0.5 weight percent and zirconium and magnesium in a total amount within the range of from about 0.015 to about 1.25 weight percent, the balance of said composition being platinum.

19. A composition consisting essentially of rhodium in an amount within the range of from about 10 to about 40 weight percent, boron in an amount within the range of from 0.001 to about 0.5 weight percent hafnium and magnesium in a total amount within the range of from about 0.015 to about 1.25 weight percent, the balance of said composition being platinum.

20. A composition consisting essentially of rhodium in an amount within the range of from about 10 to about 40 weight percent, boron in an amount within the range of from 0.001 to about 0.5 weight percent and at least one element selected from the group consisting of yttrium, lanthanium, titanium, niobium, and tantalum in a total amount within the range of from about 0.015 to about 1.25 percent, the balance of said composition being platinum.

* * * * *